US007827251B2

(12) United States Patent
Kamisetty et al.

(10) Patent No.: US 7,827,251 B2
(45) Date of Patent: Nov. 2, 2010

(54) FAST WRITE OPERATIONS TO A MIRRORED VOLUME IN A VOLUME MANAGER

(75) Inventors: Jeevan Kamisetty, San Jose, CA (US); Maurilio Cometto, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 322 days.

(21) Appl. No.: 11/868,675

(22) Filed: Oct. 8, 2007

(65) Prior Publication Data
US 2008/0104321 A1 May 1, 2008

Related U.S. Application Data

(60) Provisional application No. 60/955,787, filed on Aug. 14, 2007.

(51) Int. Cl.
*G06F 15/16* (2006.01)
(52) U.S. Cl. ........................................ 709/213; 711/161
(58) Field of Classification Search ......... 709/211–227; 711/114, 150, 162, 167, 203, 161
See application file for complete search history.

(56) References Cited

U.S. PATENT DOCUMENTS

| 6,876,656 | B2 * | 4/2005 | Brewer et al. | 370/392 |
| 6,880,062 | B1 * | 4/2005 | Ibrahim et al. | 711/202 |
| 6,898,670 | B2 | 5/2005 | Nahum | |
| 7,116,666 | B2 * | 10/2006 | Brewer et al. | 370/392 |
| 7,181,578 | B1 | 2/2007 | Guha et al. | |
| 7,287,181 | B2 | 10/2007 | Thompson | |
| 7,460,528 | B1 * | 12/2008 | Chamdani et al. | 370/381 |
| 7,484,058 | B2 * | 1/2009 | Frey et al. | 711/162 |
| 7,529,781 | B2 * | 5/2009 | Frey et al. | 707/204 |
| 2003/0172149 | A1 * | 9/2003 | Edsall et al. | 709/224 |
| 2006/0274755 | A1 * | 12/2006 | Brewer et al. | 370/392 |

OTHER PUBLICATIONS

Daniel A. Menasce, Tatuo Nakanishi, "Oerformance Evaluation of a two Phase Commit Protocol for DDBs," Proceeding of the 1st ACM SIGACT-SIGMOD symposium on Principles of databse systems, May 1982.*

(Continued)

*Primary Examiner*—Moustafa M Meky
(74) *Attorney, Agent, or Firm*—Weaver Austin Villeneuve & Sampson LLP

(57) ABSTRACT

In one embodiment, a method is provided comprising: receiving, at a virtualizer, a write command from an initiator in a storage area network, wherein the storage area network includes the initiator and a plurality of mirrored storages; sending, from the virtualizer, a write command to the plurality of mirrored storages; receiving, at the virtualizer, a transfer ready message from a first of the plurality of mirrored storages; sending a transfer ready message from the virtualizer to the initiator in response to the receiving of the transfer ready message from the first of the plurality of mirrored storages; receiving, at the virtualizer, a data message from the initiator; and sending, from the virtualizer, a data message to the plurality of mirrored storage once transfer ready messages have been received from each of the plurality of mirrored storages.

20 Claims, 7 Drawing Sheets

OTHER PUBLICATIONS

Peertopatent Community Patent Review (2008) (Larry Breen), "Two Phase Commit in Distributed Databases," [online] retrieved from Interent on Aug. 28, 2008, 5 pages http://www.peertopatent.org/priorart/241/detail.*

Daniel A. Menascé, Tatuo Nakanishi, "Performance Evaluation of a Two-Phase Commit Protocol for DDBs," Proceedings of the 1st ACM SIGACT-SIGMOD symposium on Principles of database systems, May 1982.

Peertopatent Community Patent Review (2008) (Larry Breen), "Two Phase Commit in Distributed Databases," [online] retrieved from Internet on Aug. 28, 2008, 5 pages http://www.peertopatent.org/priorart/241/detail.

Menasce, Performance Evaluation of . . . , ACM, 1982.

International Search Report and Written Opinion dated Jul. 14, 2009, from PCT/US08/72180.

* cited by examiner

FAST WRITE OPERATIONS TO A MIRRORED VOLUME IN A VOLUME MANAGER

CROSS-REFERENCE TO RELATED APPLICATIONS

This application claims priority under 35 U.S.C. §119(e) to U.S. Provisional Patent Application No. 60/955,787, entitled "FAST WRITE OPERATIONS TO A MIRRORED VOLUME IN A VOLUME MANAGER," filed on Aug. 14, 2007 by Maurilio Cometto and Jeevan Kamisetty, herein incorporated by reference in its entirety.

BACKGROUND

1. Technical Field

The present disclosure relates to storage area networks.

2. Description of the Related Art

Storage Area Networks (SANs) are computer systems in which large mass storages such as Redundant Array of Independent Disks (RAID) devices are connected to a central processor or processors via high-speed network technology (as opposed to, for example, via a system bus). SANs are increasingly used to store vast amounts of information and their usage has grown exponentially with the rise of the Internet.

DESCRIPTION OF EXAMPLE EMBODIMENTS

Overview

In one embodiment, a method is provided comprising: receiving, at a virtualizer, a write command from an initiator in a storage area network, wherein the storage area network includes the initiator and a plurality of mirrored storages; sending, from the virtualizer, a write command to the plurality of mirrored storages; receiving, at the virtualizer, a transfer ready message from a first of the plurality of mirrored storages; sending a transfer ready message from the virtualizer to the initiator in response to the receiving of the transfer ready message from the first of the plurality of mirrored storages; receiving, at the virtualizer, a data message from the initiator; and sending, from the virtualizer, a data message to the plurality of mirrored storage once transfer ready messages have been received from each of the plurality of mirrored storages.

In another embodiment, a method is provided comprising: receiving, at a virtualizer, a write command from an initiator in a storage area network, wherein the storage area network includes the initiator and a plurality of mirrored storages; sending, from the virtualizer, a write command to the plurality of mirrored storages; receiving, at the virtualizer, transfer ready messages from each of the plurality of mirrored storages; and sending a transfer ready message from the virtualizer to the initiator once transfer ready messages have been received from each of the plurality of mirrored storages.

Example Embodiments

In this application, numerous specific details are set forth in order to provide a thorough understanding of the present invention. It will be obvious, however, to one skilled in the art, that the present invention may be practiced without some or all of these specific details. In other instances, well known process steps have not been described in detail in order to not obscure the present invention.

The components, process steps, and/or data structures described herein may be implemented using various types of operating systems, computing platforms, computer programs, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Embodiments are also conceived wherein switches are used operating an internetwork operating system. Implementations are also possible wherein various aspects of the invention are embodied in a program storage device as a series of instructions readable by a machine.

Figure 1:
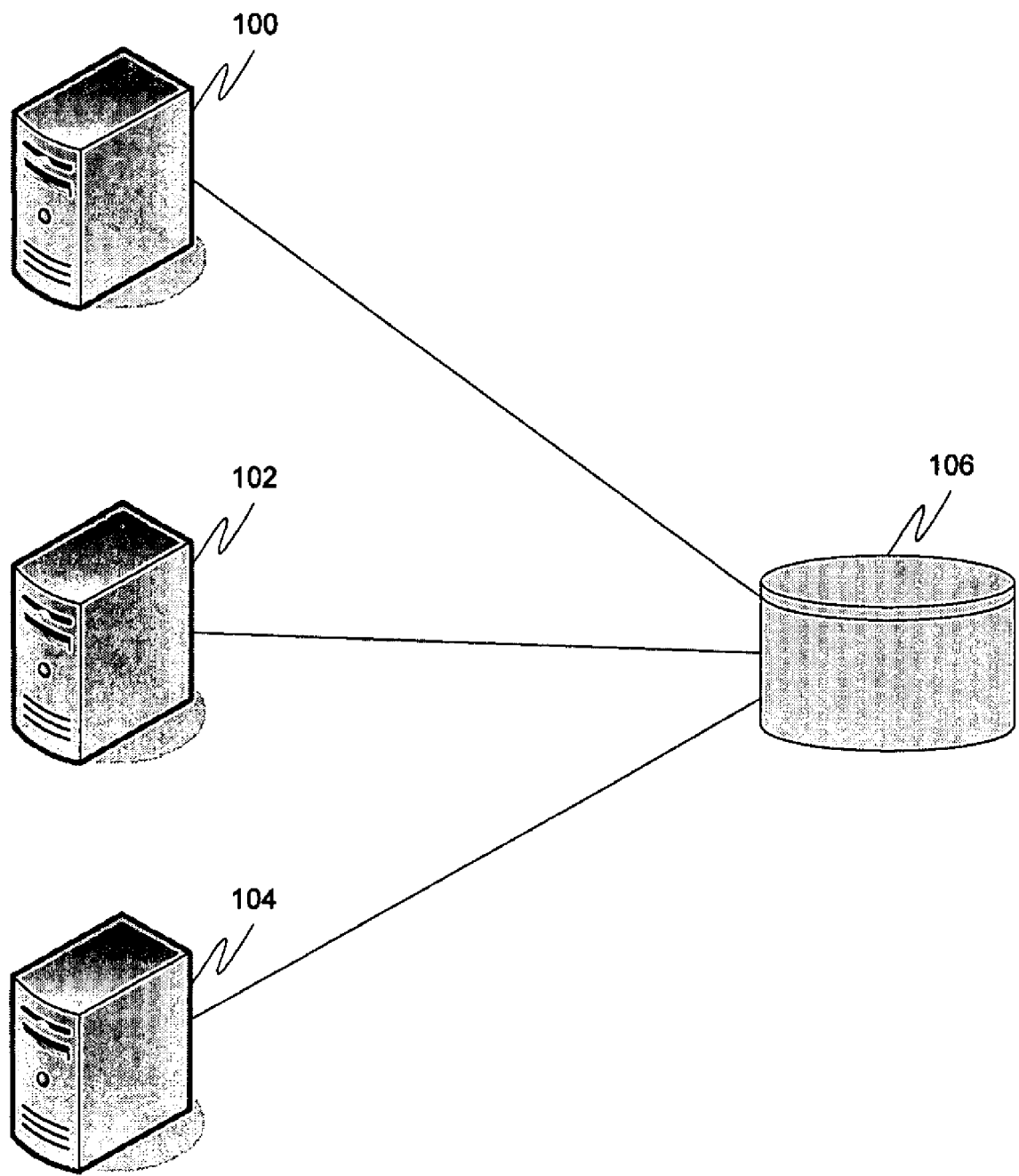
FIG. 1 illustrates an example centralized SAN.

There are two general ways to implement SANs: centralized and decentralized. A centralized SAN ties multiple initiators into a single storage system with large amounts of cache and redundant power supplies. FIG. 1 illustrates an example centralized SAN. Initiators, also known as hosts 100, 102, 104 communicate with a large mass storage 106.

Figure 2:
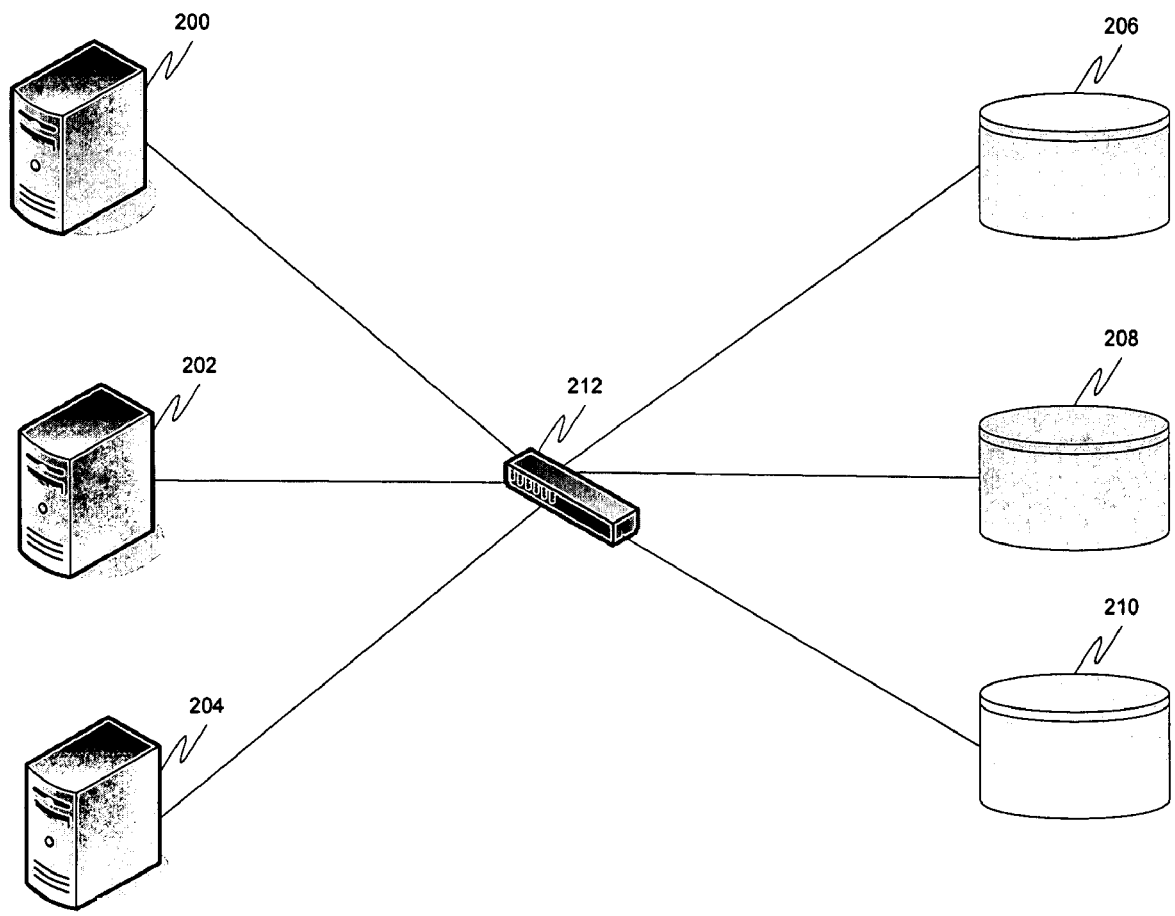
FIG. 2 illustrates an example distributed SAN.

A decentralized SAN, on the other hand, connects multiple mass storages with a centralized controller, such as a switch, that coordinates storage between the initiators and the multiple mass storages. FIG. 2 illustrates an example distributed SAN. Here, initiators 200, 202, 204 communicate with a virtual SAN comprised of a number of large mass storages 206, 208, 210 via a switch 212. It will be appreciated that there may be a one or more intermediate devices between initiators 200, 202, 204 and switch 212 and/or between switch 212 and mass storages 206, 208, 210.

There are a number of various applications that can be utilized within a SAN, for example, volume management applications, data replication applications, data migration applications, and data protection applications, among many others. These applications can be operated at, for example, the initiator side or the storage side.

The input and output from and to initiators and storages in a SAN are known collectively as the SAN's exchange, or flow. The exchange is typically measured in Input/Outputs (IOs). Traditionally, each input or output was sent by a initiator and terminated at a storage, or vice-versa. This is because the application that would be transmitting or interpreting the IO was located at either an initiator or a storage. In an embodiment of the present invention IOs may be terminated at the switch, or some other device or component, located in between the initiator and the storage. This device or component may be known as a "virtualizer," since it provides a virtual representation of a storage to an initiator and a virtual representation of an initiator to a storage. It should be noted that the term "storage" as used throughout this document may refer to either a single storage device or a group of storage devices.

Figure 3:
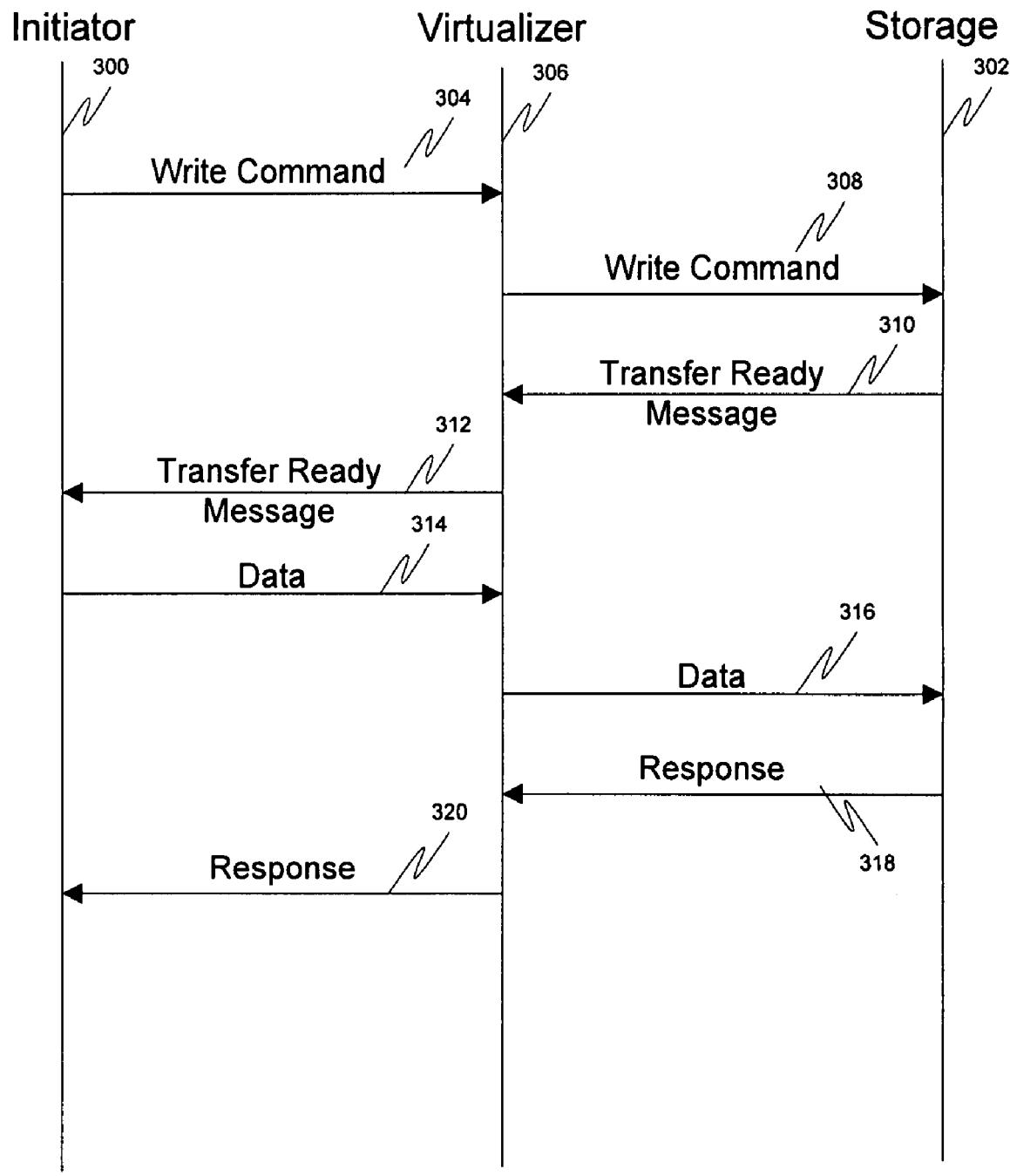
FIG. 3 illustrates an example of a write command executed in a SAN.

FIG. 3 illustrates an example of a write command executed in a SAN having a virtualizer. Rather than communications occurring directly between initiator 300 and storage 302, the command 304 is first terminated at a virtualizer 306. The virtualizer may be a switch, but one of ordinary skill in the art will recognize that the virtualizer may comprise any combination of hardware or software that acts to virtualize storages. The virtualizer 306 virtualizes one or more storages (e.g., 206, 208 and/or 210 of FIG. 2; a single storage 302 is depicted in FIG. 3). Each virtual storage may have a virtual logic unit number (VLUN) and may comprise one or more physical storages. When the virtualizer 306 receives the write command 304, it may perform one or more processes on the command, and then generate a resulting write command 308 for communication to storage 302. The storage 302 responds with a response (such as a transfer ready message 310) indicating the amount of available space it has for writing. Upon receipt of the transfer ready command 310, the switch may generate a transfer ready command 312 to the initiator 300, which may respond with the actual data 314, which the switch then sends to the corresponding storage 302 for storage in data message 316. It should be noted that the term "transfer ready message" as used throughout this document shall be construed to mean any communication that indicates that a storage device is ready to receive a transfer of data to be written. Once the write is complete, the storage 302 may send response 318 to virtualizer 306, which may then send response 320 to initiator 300. These responses may indicate the status of the write command.

The method described in FIG. 3 works well in cases where write commands map to a single write on the back-end (i.e., writing to a single storage). However, in cases where there is a mirrored VLUN (i.e., the same write command mirrored to a plurality of storages), a problem is encountered because it is unclear at what point the switch 306 should generate a transfer ready command 312 to the initiator 300.

Figure 4:
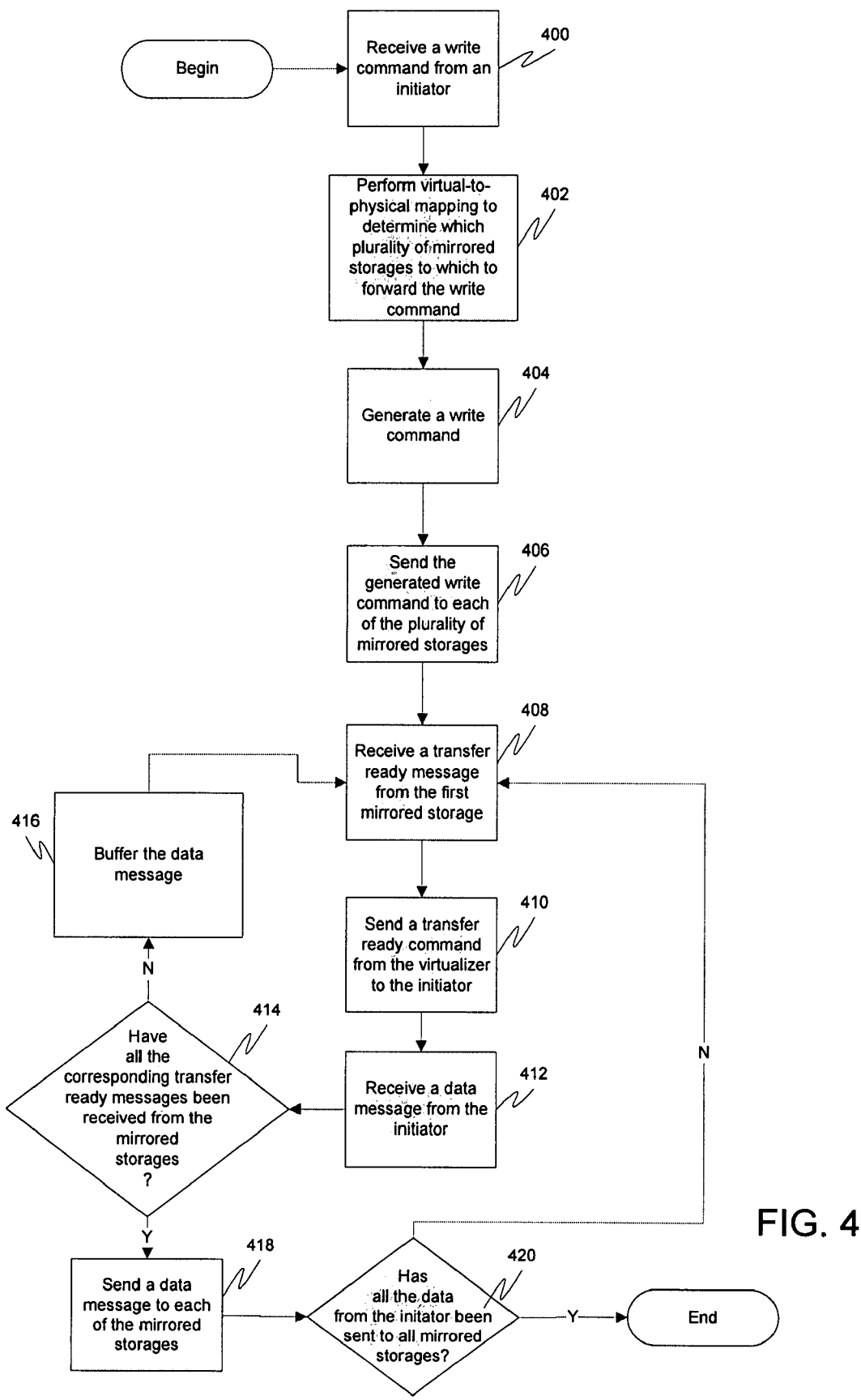
FIG. 4 is an example method according to a first embodiment.

In one embodiment, in a mirrored storage environment, a transfer ready message is sent from the virtualizer to the initiator when the initiator receives the first transfer ready message from one of the mirrored storages. FIG. 4 is an example method according to this first embodiment. At 400, the virtualizer receives a write command from an initiator. The write command may contain a request to write to a particular VLUN at a logical block address for a number of blocks. At 402, the virtualizer may perform virtual-to-physical mapping to determine which plurality of mirrored storages to which to forward the write command. At 404, a write command is generated by the virtualizer. This write command may contain the logical block address and number of blocks from the write command received from the initiator, but may contain an identification of the mirrored storages to which to forward the command. It should be noted that it is possible that a single write command is generated and sent to both storages, but embodiments are also envisioned wherein multiple write commands are generated, which are identical except for their destination storages. As is known to those of ordinary skill in the art, such nearly identical messages are technically the same message simply with different headers, and as such should be construed as a single generated message in this document. At 406, the generated write command(s) is/are sent to each of the plurality of mirrored storages.

At 408, a transfer ready message is received from the first mirrored storage. This message may contain the number of blocks the first storage has available for the write command. At 410, a transfer ready message may be sent from the virtualizer to the initiator. This transfer ready message may contain the number of blocks the first storage has available (as received in the message in 408).

At this point, one of two events may occur. Either a data message may be received at the virtualizer from the initiator, or a transfer ready message may be received from the second storage (and/or additional mirrored storages). In cases where a transfer ready message is received prior to the related data message being received, the transfer ready message may be buffered. When the data message is eventually received, it may be buffered until it is determined that all of the transfer ready messages for the mirrored storages have been received. In cases where the data message is received from the initator prior to transfer ready messages being received from all of the mirrored storages, the data message may be buffered until all of the transfer ready messages have been received, at which point a data message may be sent to each of the mirrored storages.

Thus, at 412, a data message may be received from the initator. This may be before or after additional transfer ready messages are received from the other mirrored storages. This data message may contain data to be written to the mirrored storages. At 414, it may be determined if all of the corresponding transfer ready messages have been received from the mirrored storages. If not, then at 416, the data message may be buffered and the process may loop back to 408. If so, then at 418, a data message is sent to each of the plurality of mirrored storages once transfer ready messages have been received from each of the plurality of mirrored storages. This data message may contain the data to be written to the mirrored storages that was received in 412. At 420 it may be determined if all data from the initator has been sent to all the mirrored storages. If so, the process may end. If not, the process may loop back to 408.

Figure 5:
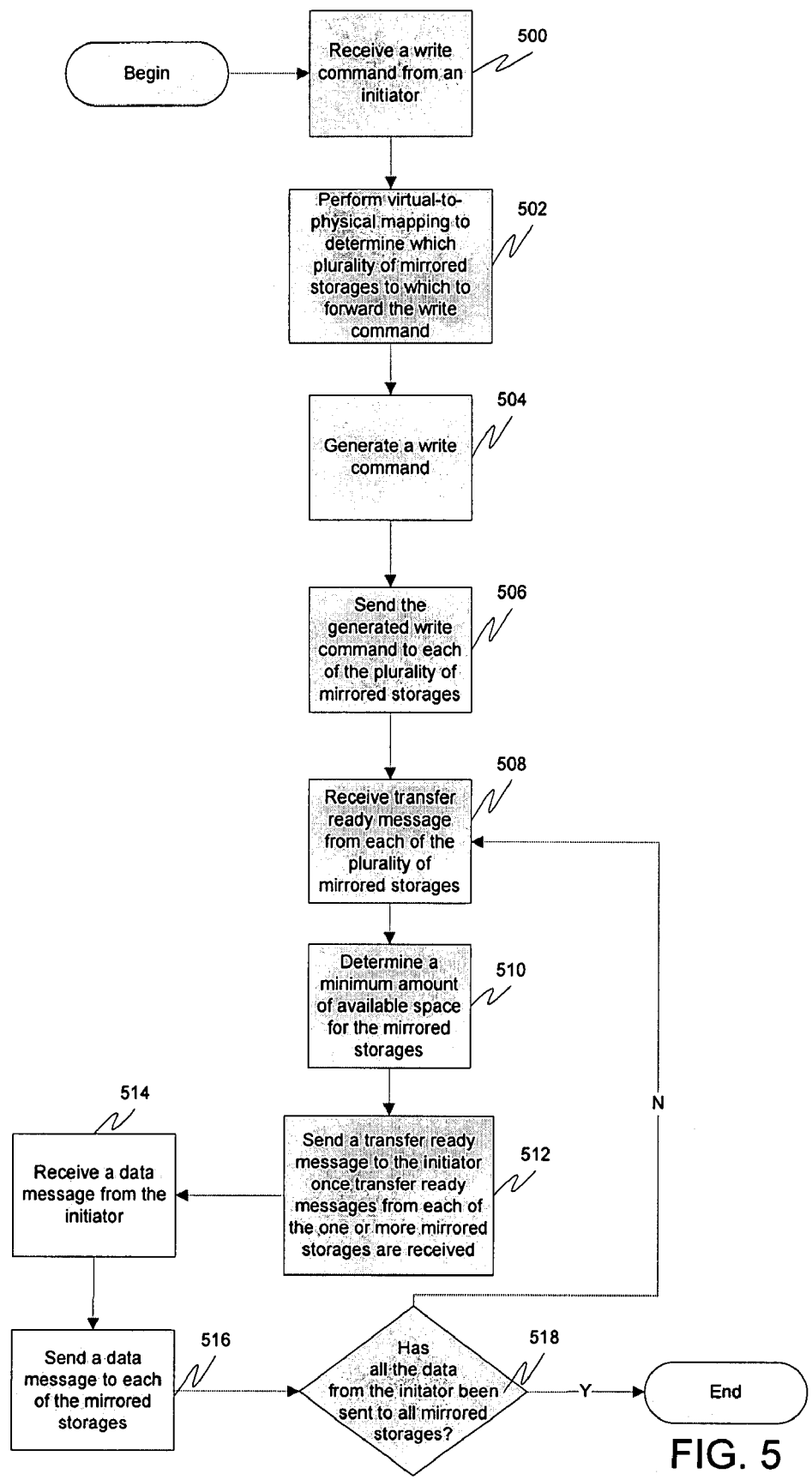
FIG. 5 is an example method according to a second embodiment.

In another embodiment, in a mirrored storage environment, a transfer ready message is sent from the virtualizer to the initiator only once the initiator receives the transfer ready messages from all of the mirrored storages. FIG. 5 is an example method according to this second embodiment. At 500, the virtualizer receives a write command from an initiator. The write command may contain a request to write to a particular VLUN at a logical block address for a number of blocks. At 502, the virtualizer may perform virtual-to-physical mapping to determine which plurality of mirrored storages to which to forward the write command. At 504, a write command is generated by the virtualizer. This write command may contain the logical block address and number of blocks from the write command received from the initiator, but may contain an identification of the mirrored storage(s) to which to forward the command. It should be noted that it is possible that a single write command is generated and sent to both storages, but embodiments are also envisioned wherein multiple write commands are generated, which are identical except for their destination storages. At 506, the write command(s) is/are sent to each of the plurality of mirrored storages.

At 508, transfer ready messages are received from each of the plurality of mirrored storages. These messages may contain the number of blocks the first storage has available for the write command. Once all of the transfer ready messages have been received (i.e., from each of the plurality of mirrored storages), at 510 the minimum amount of available space for the mirrored storages may be determined. This information may be obtained by examining the transfer ready messages, which contain the number of available blocks for the corresponding mirrored storages, and taking the minimum (or, in an alternative embodiment, the maximum) number of blocks indicated in the received transfer ready messages. For example, if transfer ready messages are received from three mirrored storages, the first listing 10 available blocks, the second listing 5 available blocks, and the third listing 15 available blocks, then the minimum available space for the mirrored storages is 5 blocks. At 512, a transfer ready message is sent from the virtualizer to the initiator once transfer ready messages from each of the plurality of mirrored storages are received. This transfer ready message may contain the minimum amount of available space as determined in step 510.

At 514, a data message may be received from the initator. This data message may include data to be written to the mirrored storages. At 516, a data message is sent to each of the plurality of mirrored storages. This data message may contain the data to be written to the mirrored storages that was received in 514. At 518 it may be determined if all data from the initator has been sent to all the mirrored storages. If so, the process may end. If not, the process may loop back to 508. It should be noted that transmissions may be repeated in cases where the transmission has been unsuccessful, such as where the data has been corrupted or the transmission interrupted.

It should be noted that in both embodiments, the virtualizer may delay the transfer ready message being sent from the virtualizer to the initiator if the transfer ready messages received from the mirrored storage(s) indicate an amount of available space that is less than the amount the initiator originally requested. In such cases, the virtualizer may delay the transfer ready message being sent to the initator until additional transfer ready messages are received from the mirrored storage(s) indicating that the amount of available space is greater than or equal to the amount the initiator originally requested. In the SCSI protocol, the virtualizer does not wait for an additional transfer ready message from the same storage device and instead fulfills the request before the device is allowed to send another transfer ready message. Additionally, in the SCSI protocol, a device cannot offer to store more data than was requested. Nevertheless, embodiments are anticipated where neither of these limitations exist. Thus, in FIG. 4, step 410 may be delayed if the transfer ready message received in 408 indicates that the first mirrored storage has available space that is less than the amount requested by the initiator in the write command of step 400. Step 410 may be delayed until additional transfer ready messages are received from the first mirrored storage indicating that it has available space that is greater than or equal to the amount requested by the initator in the write command of step 400. Likewise, in FIG. 5, step 512 may be delayed until transfer ready requests are received from each of the mirrored storages such that the minimum available space from the received transfer ready messages is greater than or equal to the amount requested by the initiator in the write command of step 500.

It should also be noted that the term "mirrored storages" as used throughout this document shall be construed to mean two or more storages that have been assigned to a single logical storage such that write commands executed on each storage should be duplicated on each other storage, in order to attempt to create storages that contain identical information.

In one embodiment of the present invention, customized hardware may be utilized for the initiator that is compatible with a standard switch. Such an embodiment avoids the necessity of modifying a switch itself. This hardware may be known as a storage services module (SSM), which may be a blade that plugs into the switch and comprises hardware and software. Alternative embodiments are possible where the switch itself is utilized, or where alternative hardware and/or software is utilized.

Figure 6:
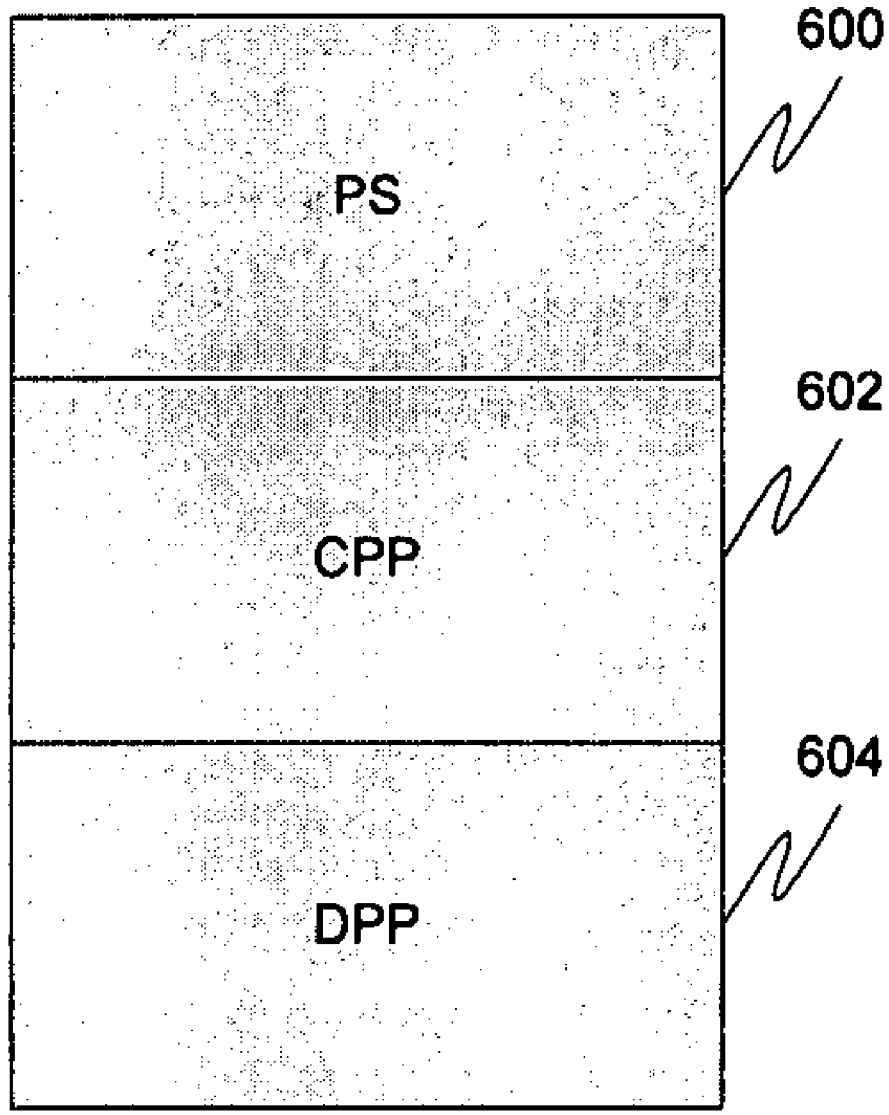
FIG. 6 illustrates an example software stack.

In an embodiment of the present invention, the software utilized may be split into three separate parts. FIG. 6 illustrates an example software stack. Partner Software (PS) layer 600 may include the underlying application to be run. A Control Path Processor (CPP) layer 602 may control the software and hardware. A Data Path Processor (DPP) layer 604 may be where the application processes themselves may be executed. Each DPP essentially represents a single processor or core in a multi-processor or multi-core environment. These stack layers permit fine granularity control over multi-processor or multi-core systems.

Figure 7:
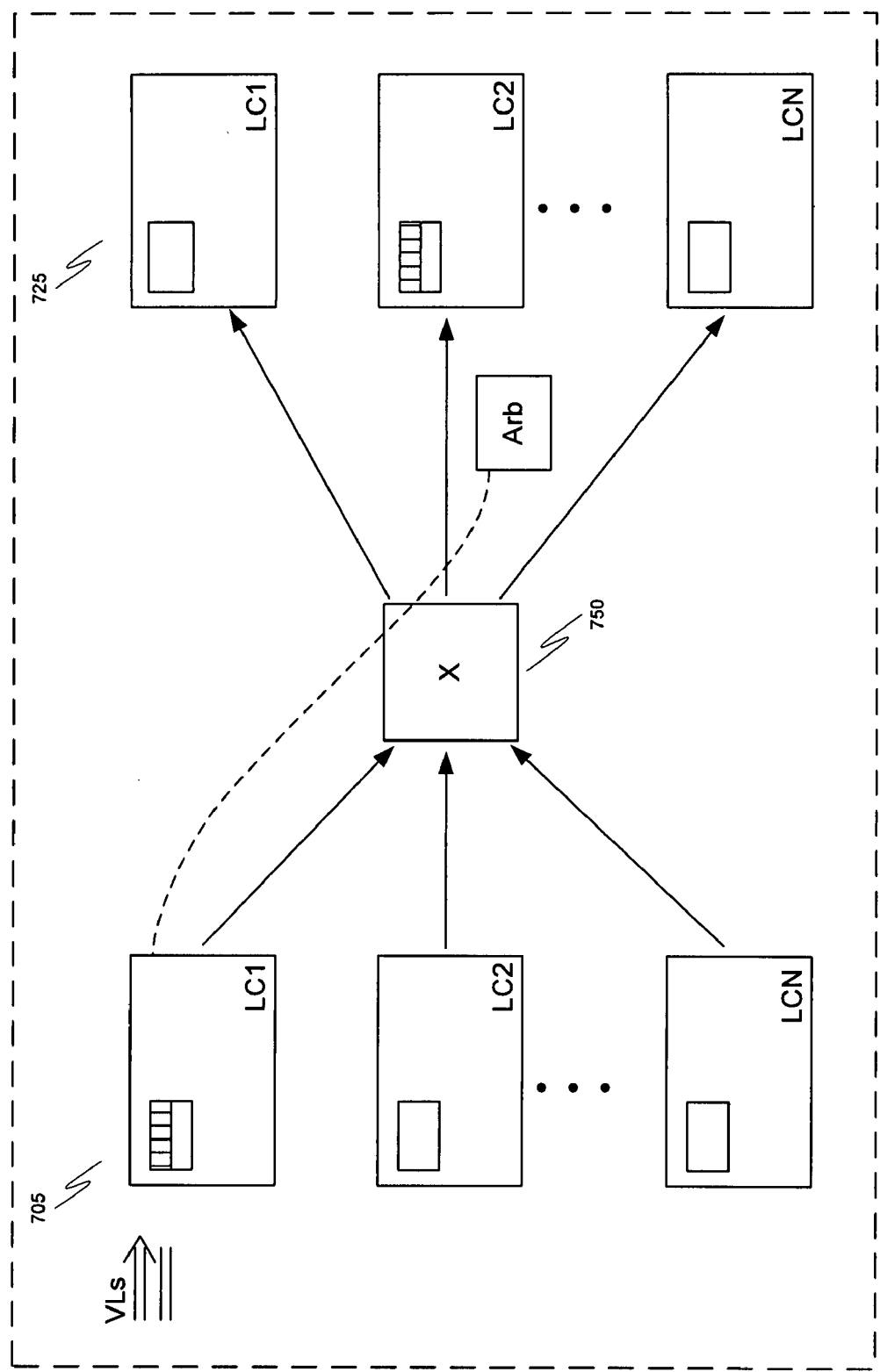
FIG. 7 illustrates an example simplified architecture of a switch.

FIG. 7 illustrates a simplified architecture of a switch 700. Switch 700 includes N line cards, each of which characterized by an ingress side (or input) 705 and an egress side (or output) 725. Line card ingress sides 705 are connected via switching fabric 750, which includes a crossbar in this example, to line card egress sides 725. In this embodiment, one or more line cards performs one or more of the processes described above.

One common protocol used to communicate within a SAN is the Small Computing System Interface (SCSI). Initiators can communicate at high speed via the SCSI protocol by utilizing Fibre Channel (FC) switching technology. Nevertheless, embodiments are envisioned wherein other storage area network protocols and switching technology are utilized.

Although illustrative embodiments and applications of this invention are shown and described herein, many variations and modifications are possible which remain within the concept, scope, and spirit of the invention, and these variations would become clear to those of ordinary skill in the art after perusal of this application. Accordingly, the embodiments described are to be considered as illustrative and not restrictive, and the invention is not to be limited to the details given herein, but may be modified within the scope and equivalents of the appended claims.

We claim:

1. A method comprising:
   receiving, at a virtualizer, a write command from an initiator in a storage area network, wherein the storage area network includes the initiator and a plurality of mirrored storages;
   sending, from the virtualizer, a write command to the plurality of mirrored storages;
   receiving, at the virtualizer, a transfer ready message from a first of the plurality of mirrored storages;
   sending a transfer ready message from the virtualizer to the initiator in response to the receiving of the transfer ready message from the first of the plurality of mirrored storages;
   receiving, at the virtualizer, a data message from the initiator;
   sending, from the virtualizer, a data message to the plurality of mirrored storage once transfer ready messages have been received from each of the plurality of mirrored storages, wherein the transfer ready message received from the first of the plurality of mirrored storages contains an indication of an amount of available space and the transfer ready message sent to the initiator contains the indication of the amount of available space; and
   buffering the transfer ready message received from the first of the plurality of mirrored storages if the transfer ready message received from the first of the plurality of mirrored storages contains an indication of an amount of available space that is less than an indication of a requested amount of space contained in the write command received from the initiator.

2. The method of claim 1, further comprising:
   receiving, at the virtualizer, prior to the receiving of the data message from the initiator, a transfer ready message from a second of the plurality of mirrored storages; and buffering the transfer ready message from the second of the plurality of mirrored storages.

3. The method of claim 1, further comprising:
buffering the data message from the initiator; and
receiving a transfer ready message from a second of the plurality of mirrored storages.

4. The method of claim 1, wherein the write command received from the initiator contains an indication of a requested amount of space to perform a write operation and the write command sent to the plurality of mirrored storages contains the indication of the requested amount of space.

5. The method of claim 1, wherein the data message received from the initiator contains data to be written and the data message sent to the plurality of mirrored storages contains the data to be written.

6. A method comprising:
receiving, at a virtualizer, a write command from an initiator in a storage area network, wherein the storage area network includes the initiator and a plurality of mirrored storages;
sending, from the virtualizer, a write command to the plurality of mirrored storages;
receiving, at the virtualizer, transfer ready messages from each of the plurality of mirrored storages;
sending a transfer ready message from the virtualizer to the initiator once transfer ready messages have been received from each of the plurality of mirrored storages, wherein the received transfer ready messages each contain an indication of an amount of available space; and
buffering the transfer ready messages received from the plurality of mirrored storages if a received transfer ready message contains an indication of an amount of available space that is less than an indication of a requested amount of space contained in the write command received from the initiator.

7. The method of claim 6, further comprising:
receiving, at the virtualizer, a data message from the initiator; and
sending, from the virtualizer, a data message to the plurality of mirrored storage once transfer ready messages have been received from each of the plurality of mirrored storages.

8. The method of claim 6, further comprising:
determining a minimum indication of amount of available space from the indications of amounts of available space contained in the received transfer ready messages; and
wherein the transfer ready message sent to the initiator contains the minimum indication of amount of available space.

9. The method of claim 6, wherein the write command received from the initiator contains an indication of a virtual storage and the method further comprises:
performing virtual to physical mapping using the indication of a virtual storage to determine to which a plurality of mirrored storages to send a write command.

10. The method of claim 9, wherein the indication of a virtual storage is a virtual logic unit number (VLUN).

11. A switch comprising:
one or more line cards, wherein at least one of the one or more line cards is designed to:
receive, at a virtualizer, a write command from an initiator in a storage area network, wherein the storage area network includes the initiator and a plurality of mirrored storages;
send, from the virtualizer, a write command to the plurality of mirrored storages;
receive, at the virtualizer, a transfer ready message from one of the plurality of mirrored storages;
send a transfer ready message from the virtualizer to the initiator in response to the receiving of the transfer ready message from the one of the plurality of mirrored storages;
receive, at the virtualizer, a data message from the initiator;
send, from the virtualizer, a data message to the plurality of mirrored storage once transfer ready messages have been received from each of the plurality of mirrored storages, wherein the transfer ready message received from the one of the plurality of mirrored storages contains an indication of an amount of available space and the transfer ready message sent to the initiator contains the indication of the amount of available space; and
buffer the transfer ready message received from the one of the plurality of mirrored storages if the transfer ready message received from the one of the plurality of mirrored storages contains an indication of an amount of available space that is less than an indication of a requested amount of space contained in the write command received from the initiator.

12. The switch of claim 11, wherein the write command received from the initiator contains an indication of a requested amount of space to perform a write operation and the write command sent to the plurality of mirrored storages contains the indication of the requested amount of space.

13. The switch of claim 11, wherein the data message received from the initiator contains data to be written and the data message sent to the plurality of mirrored storages contains the data to be written.

14. A switch comprising:
one or more line cards, wherein at least one of the one or more line cards is designed to:
receive, at a virtualizer, a write command from an initiator in a storage area network, wherein the storage area network includes the initiator and a plurality of mirrored storages;
send, from the virtualizer, a write command to the plurality of mirrored storages;
receive, at the virtualizer, transfer ready messages from each of the plurality of mirrored storages;
send a transfer ready message from the virtualizer to the initiator once transfer ready messages have been received from each of the plurality of mirrored storages, wherein the received transfer ready messages each contain an indication of an amount of available space; and
buffer the transfer ready messages received from the plurality of mirrored storages if a received transfer ready message contains an indication of an amount of available space that is less than an indication of a requested amount of space contained in the write command received from the initiator.

15. A storage area network comprising:
an initiator;
a plurality of mirrored storages; and
a virtualizer, wherein the virtualizer is configured to:
receive, at a virtualizer, a write command from an initiator in a storage area network, wherein the storage area network includes the initiator and a plurality of mirrored storages;
send, from the virtualizer, a write command to the plurality of mirrored storages;

receive, at the virtualizer, a transfer ready message from one of the plurality of mirrored storages;

send a transfer ready message from the virtualizer to the initiator in response to the receiving of the transfer ready message from the one of the plurality of mirrored storages;

receive, at the virtualizer, a data message from the initiator;

send, from the virtualizer, a data message to the plurality of mirrored storage once transfer ready messages have been received from each of the plurality of mirrored storages, wherein the transfer ready message received from the one of the plurality of mirrored storages contains an indication of an amount of available space and the transfer ready message sent to the initiator contains the indication of the amount of available space; and buffer the transfer ready message received from the one of the plurality of mirrored storages if the transfer ready message received from the one of the plurality of mirrored storages contains an indication of an amount of available space that is less than an indication of a requested amount of space contained in the write command received from the initiator.

16. A storage area network comprising:

an initiator;

a plurality of mirrored storages; and a virtualizer, wherein the virtualizer is configured to:

receive, at a virtualizer, a write command from an initiator in a storage area network, wherein the storage area network includes the initiator and a plurality of mirrored storages;

send, from the virtualizer, a write command to the plurality of mirrored storages;

receive, at the virtualizer, transfer ready messages from each of the plurality of mirrored storages; and send a transfer ready message from the virtualizer to the initiator once transfer ready messages have been received from each of the plurality of mirrored storages, wherein the received transfer ready messages each contain an indication of an amount of available space; and buffer the transfer ready messages received from the plurality of mirrored storages if a received transfer ready message contains an indication of an amount of available space that is less than an indication of a requested amount of space contained in the write command received from the initiator.

17. An apparatus comprising:

means for receiving, at a virtualizer, a write command from an initiator in a storage area network, wherein the storage area network includes the initiator and a plurality of mirrored storages;

means for sending, from the virtualizer, a write command to the plurality of mirrored storages;

means for receiving, at the virtualizer, a transfer ready message from a first of the plurality of mirrored storages;

means for sending a transfer ready message from the virtualizer to the initiator in response to the receiving of the transfer ready message from the first of the plurality of mirrored storages;

means for receiving, at the virtualizer, a data message from the initiator;

means for sending, from the virtualizer, a data message to the plurality of mirrored storage once transfer ready messages have been received from each of the plurality of mirrored storages, wherein the transfer ready message received from the plurality of mirrored storages contains an indication of an amount of available space and the transfer ready message sent to the initiator contains the indication of the amount of available space; and means for buffering the transfer ready message received from the plurality of mirrored storages if the transfer ready message received from the plurality of mirrored storages contains an indication of an amount of available space that is less than an indication of a requested amount of space contained in the write command received from the initiator.

18. The apparatus of claim 17, wherein the write command received from the initiator contains an indication of a requested amount of space to perform a write operation and the write command sent to the plurality of mirrored storages contains the indication of the requested amount of space.

19. The apparatus of claim 17, wherein the data message received from the initiator contains data to be written and the data message sent to the plurality of mirrored storages contains the data to be written.

20. An apparatus comprising:

means for receiving, at a virtualizer, a write command from an initiator in a storage area network, wherein the storage area network includes the initiator and a plurality of mirrored storages;

means for sending, from the virtualizer, a write command to the plurality of mirrored storages;

means for receiving, at the virtualizer, transfer ready messages from each of the plurality of mirrored storages;

means for sending a transfer ready message from the virtualizer to the initiator once transfer ready messages have been received from each of the plurality of mirrored storages, wherein the received transfer ready messages each contain an indication of an amount of available space; and means for buffering the transfer ready messages received from the plurality of mirrored storages if a received transfer ready message contains an indication of an amount of available space that is less than an indication of a requested amount of space contained in the write command received from the initiator.

* * * * *